(12) United States Patent
Most et al.

(10) Patent No.: US 8,836,323 B2
(45) Date of Patent: Sep. 16, 2014

(54) SYSTEM AND METHOD FOR DETERMINING SLUE POSITION

(75) Inventors: William R. Most, Sparland, IL (US); Aaron R. Shatters, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 548 days.

(21) Appl. No.: 12/966,126

(22) Filed: Dec. 13, 2010

(65) Prior Publication Data

US 2012/0146628 A1    Jun. 14, 2012

(51) Int. Cl.
*G01B 7/14* (2006.01)
*G01B 7/30* (2006.01)

(52) U.S. Cl.
CPC ........................................ *G01B 7/30* (2013.01)
USPC ................................ 324/207.11; 324/207.25

(58) Field of Classification Search
USPC ........................................ 324/207.11, 207.25
See application file for complete search history.

(56) References Cited

U.S. PATENT DOCUMENTS

| | | |
|---|---|---|
| 5,448,148 A | 9/1995 | Devier |
| 5,996,429 A | 12/1999 | Stickling |
| 6,052,636 A | 4/2000 | Lombardi |
| 7,746,067 B2 | 6/2010 | Brandt et al. |

FOREIGN PATENT DOCUMENTS

| | | |
|---|---|---|
| EP | 1 911 717 A2 | 4/2008 |
| JP | 60133131 A | 7/1985 |
| JP | 6074751 A | 3/1994 |

*Primary Examiner* — Reena Aurora
(74) *Attorney, Agent, or Firm* — Miller, Matthias & Hull

(57) ABSTRACT

A slue position sensing system and method of modifying a machine to include such a slue position sensing system are disclosed. The slue position sensing system may include a swing sensor housing disposed between a swing motor and a swing drive. The swing sensor housing may be coupled to a rotary position sensor that indirectly detects rotation of the target gear or a speed sensor that directly detects rotation of the target gear. For embodiments with no target gear, but with upper and lower frames rotatably coupled together by a ring gear and a swing gear, the sensor may be a rotary position sensor mounted to a slip ring assembly and magnet that are connected to a hydraulic swivel between the upper and lower frames or the sensor may be a speed sensor that detects rotation of the swing gear. The sensors generate a signal that is communicated to a controller or an ECM that accurately reflects the angular movement imparted to the work implement by the swing drive.

9 Claims, 10 Drawing Sheets

SYSTEM AND METHOD FOR DETERMINING SLUE POSITION

TECHNICAL FIELD

This disclosure relates generally to a system and method for determining the slue position or angular position of one component with respect to another component. For example, this disclosure relates generally to a system and method for determining the slue position of a housing of an excavator, crane, foundation drill, material handler, etc., with respect to an undercarriage that supports the housing.

BACKGROUND

Many machines include one or more components that rotate relative to one another. For example, typical excavators, cranes, foundation drills, material handlers, etc. include a housing disposed on top of an undercarriage. The housing is attached to a work implement such as a bucket connected to an arm and/or a boom. The housing rotates about a vertical axis with respect to the undercarriage. These machines may include a positioning system that includes a motor that rotates a gear assembly associated with a swing gear train, which in turn, rotates the housing. A closed loop control system positions the housing to a desired position. An operator rotates the housing to a desired position by accelerating the housing from a start position and decelerating the housing prior to reaching the desired position. However, the inertial forces created by a rotating housing with varying loads make it difficult to rotate the housing to the desired position accurately. Specifically, once the machine begins a rotational motion, inertia caused by the rotation may cause the housing to overshoot the desired position. This problem is prevalent when the excavator is working on a hillside or when the work implement of the machine is carrying a full load.

Automated controls that regulate the dig and dump cycles of these machines require accurate sensors to monitor the actual position of the housing. Some machines include a position-sensing system with a sensor that generates a signal related to proximity of the sensor element to a component or to a projection of a component, such as a gear tooth. Other position-sensing systems may include a sensor that senses rotational movement of a component, such as a gear. Unfortunately, a number of factors may cause significant variations in the values of the signals generated by such sensors. For example, vibrations, temperature variations, variations in the characteristics of the sensor and/or variations in the characteristics of power supplied to the sensor may increase or decrease the sensor signal value. Because of variations in such parameters, a position-sensing system employing one or more sensors may be inaccurate and therefore more robust position-sensing systems are needed.

SUMMARY OF THE DISCLOSURE

In one example, a disclosed slue position sensing system may include a swing sensor housing that accommodates a target gear. Slue position may be measured using a speed sensor, which essentially counts the number of target gear teeth that pass the speed sensor. Slue position may also be measured using a target shaft that rotates with the target gear. One end of the target shaft may be directed to a rotary position sensor, which essentially counts the rotation of the target shaft and therefore the rotations of the target gear.

One disclosed slue position sensing system may include a swing sensor housing that accommodates a target gear and a target shaft. The target gear may be coupled to a drive shaft. The drive shaft may pass through a helical gear. The target shaft may include a magnetized sensor end, a coupling end and a driven gear disposed between the coupling and sensor ends. The swing sensor housing may rotatably support the sensor end of the target shaft and the coupling end of the target shaft with the driven gear being enmeshed with the helical gear and the sensor end in proximity to a rotary position sensor. The rotary position sensor may be coupled to a controller.

In such an embodiment, the target gear may be coupled to a swing drive motor. The drive shaft may couple the target gear to a sun gear. The swing sensor housing may be disposed between a swing motor and a swing drive. The target shaft may extend across the swing sensor housing and the swing sensor housing may include two openings including a coupling opening and a sensor opening. The coupling end of the target shaft may be received in the coupling opening; the sensor end of the target shaft may be received in the sensor opening. Further, the rotary position sensor may be coupled to the sensor opening. In any of the systems disclosed above, the swing sensor housing may be round (cylindrical) or rectangular with two opposing walls. In systems employing a target shaft, coupling opening may accommodate a first bearing through which the coupling end of the target shaft may pass and the sensor opening may accommodate a second bearing through which the sensor end of the target shaft may pass. At least part of the rotary position sensor may be mounted to an exterior surface of the swing sensor housing. Any of the disclosed systems may further include placement of the swing sensor housing between a swing motor and a swing drive. In any of the disclosed systems, the sensor end of the target shaft may include a non-cylindrical shape.

Another disclosed slue position sensing system may be employed for upper and lower frames that rotate with respect to each other, such as an upper frame and an undercarriage of a wheel excavator that are rotatably coupled together by a ring gear and a swing gear. The upper frame is coupled to at least one of a rotary position sensor or speed sensor. When a rotary position sensor is employed, the rotary position sensor is part of an assembly that includes a slip ring assembly and a magnetized element disposed between the slip ring assembly and the rotary position sensor. The slip ring assembly is mounted to a swivel, one end of which is coupled to the upper frame and the other end of which is coupled to the lower frame. When a speed sensor is employed, the speed sensor is mounted to the upper frame in close proximity to the swing gear so the speed sensor can detect rotation of the swing gear.

Methods for retrofitting a swing motor and swing drive assembly with a slue position sensing system are also disclosed. One disclosed method may include: disassembling the swing motor from the swing drive; providing a swing sensor housing that may include at least one opening; installing a target gear in the swing sensor housing; installing a speed sensor over the opening so the speed sensor can detect target gear teeth passing the speed sensor. Another method includes installing a target shaft in the swing sensor housing. The target shaft includes a sensor end that is magnetized. The target shaft passes through a driven gear and the drive shaft passes through a helical gear. The driven and helical gears are enmeshed. The method further includes placing the rotary position sensor in the sensor opening in proximity to the sensor end of the target shaft.

The rotary position sensor or speed sensor may be coupled to a controller. Any of the disclosed methods may further include sealing the rotary position sensor or speed sensor in a sensor opening in the swing sensor housing. Any of the disclosed methods may also include having the swing sensor housing accommodate two speed sensors for redundancy.

Another method for retrofitting a swing drive assembly with a slue position sensing system includes providing an upper frame and a lower frame. The lower frame is coupled to a ring gear and the upper frame is coupled to a swing gear. The swing gear and ring gear are enmeshed so the upper frame may rotate about the ring gear. The method includes coupling at least one of a rotary position sensor or a speed sensor to the upper frame.

If a rotary position sensor is used, the rotary position sensor may be supported above a slip ring assembly with a magnetic element disposed between the slip ring assembly and the rotary position sensor. The slip ring assembly is disposed between the magnetic element and a swivel. The swivel includes an upper end coupled to the upper frame and a lower end coupled to the lower frame. The upper and lower ends of the swivel are rotatable with respect to each other. The swivel may be a hydraulic swivel that provides fluid communication between the upper and lower frames.

If a speed sensor is used, the speed sensor may be coupled to the upper frame in close proximity to the swing gear.

DETAILED DESCRIPTION

Figure 1:
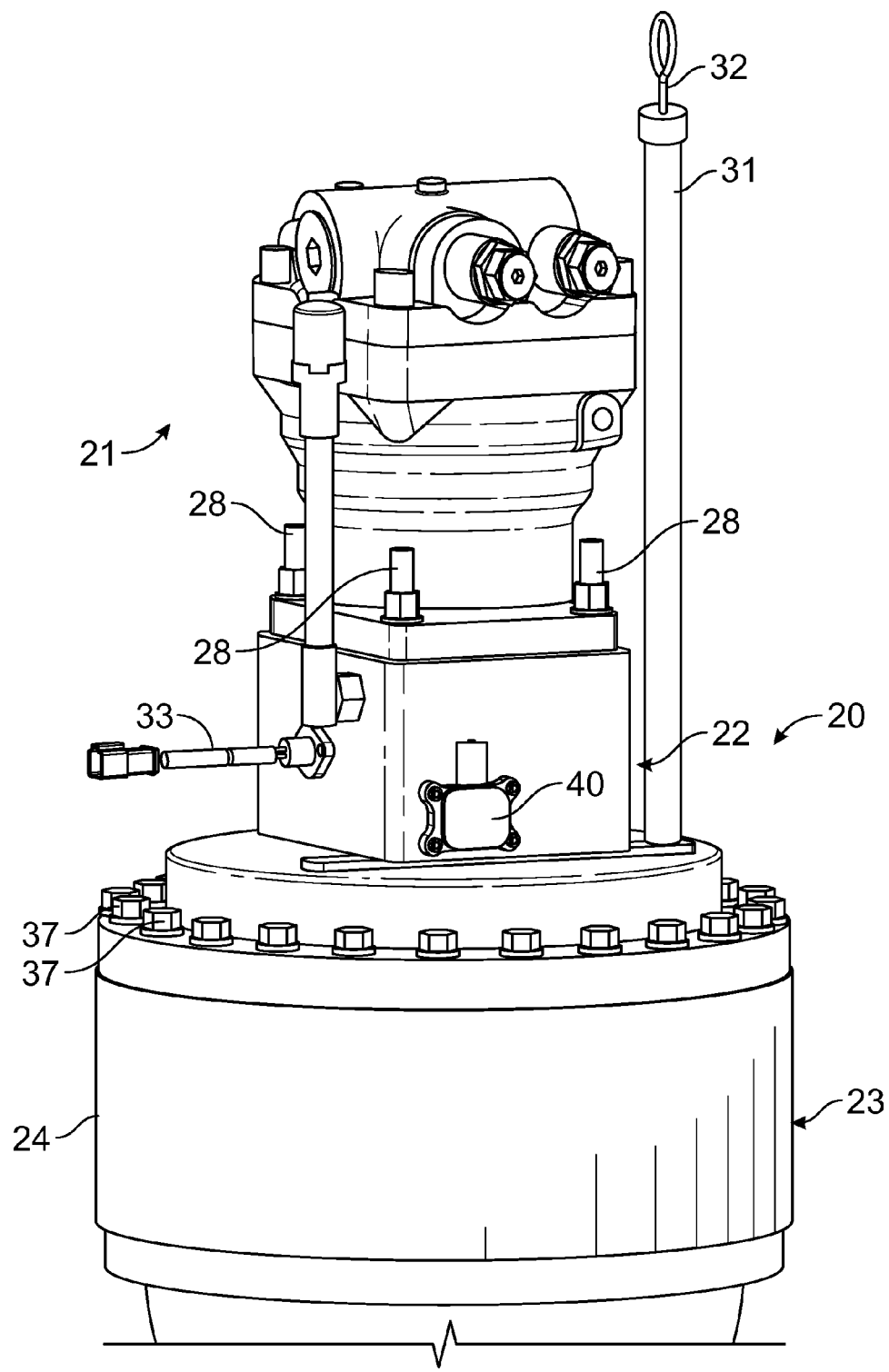
FIG. 1 is a perspective view of a swing motor, swing drive and a swing sensor housing disposed between the swing motor and swing drive.
Figure 2:
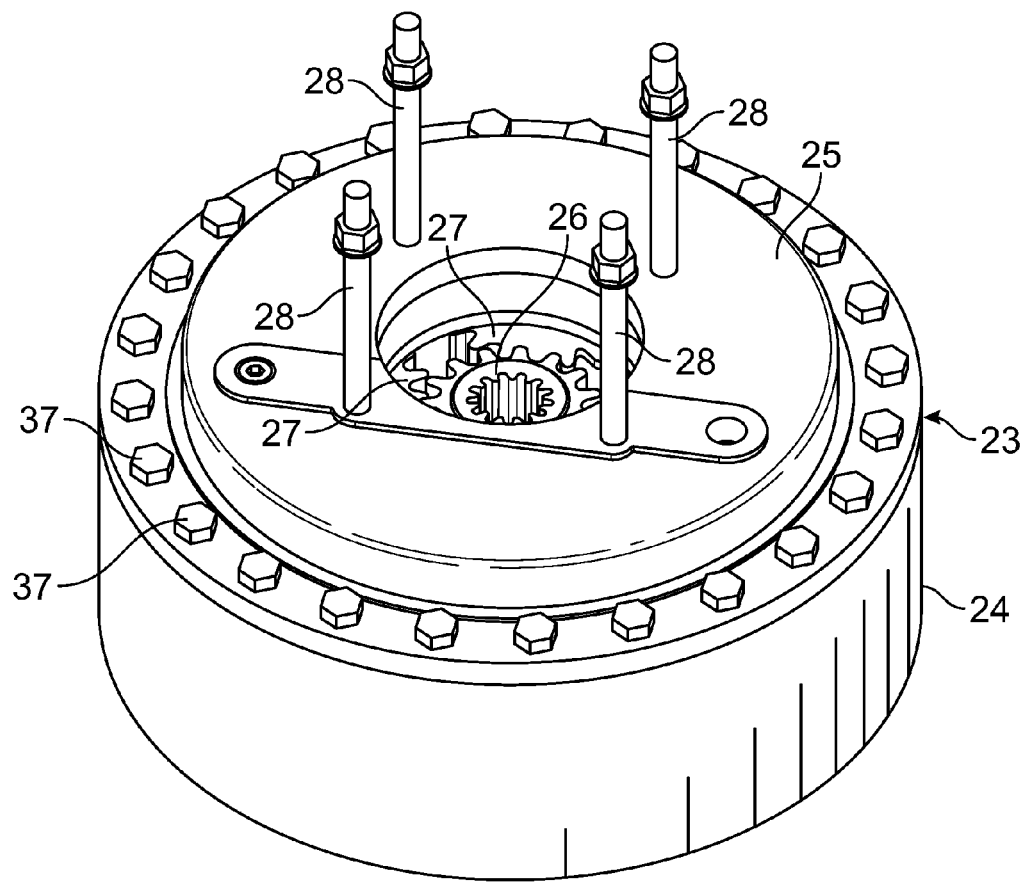
FIG. 2 is a top perspective view of the swing drive illustrated in FIG. 1 with the swing sensor housing and swing motor removed.

Turning to FIG. 1, a system 20 for rotating a work implement with respect to a track undercarriage, or, in other words, a slue positioning system 20 is disclosed. The positioning system 20 may include a swing motor assembly 21 disposed on top of a swing sensor housing 22. The swing sensor housing 22, in turn, may be disposed on top of a swing drive 23. The swing drive 23 is illustrated in FIG. 2 with the swing sensor housing 22 and swing motor assembly 21 removed. Specifically, the swing drive 23 may include a casing 24 and a swing drive cover plate 25. The swing drive cover plate 25 in combination with the swing casing 24 may house a series of gears, one of which is a sun gear 26 and a plurality of planetary gears, two of which are shown in partial view at 27 in FIG. 2. A series of studs 28 may be used to secure the swing sensor housing 22 to the swing drive cover plate 25.

Turning to FIG. 1, an oil dip stick tube 31 and dip stick 32 are employed to check the oil levels in the swing drive 23. A speed sensor 33 may be used to measure the speed of the angular motion transmitted from the swing motor assembly 21 to the swing drive 23. As an alternative or for purposes of redundancy, a rotary position sensor 40 may be mounted to the swing sensor housing 22. One or both of the sensors 33, 40 may be used to determine the slue position and will be described in greater detail below in connection with FIGS. 10-13.

Figure 3:
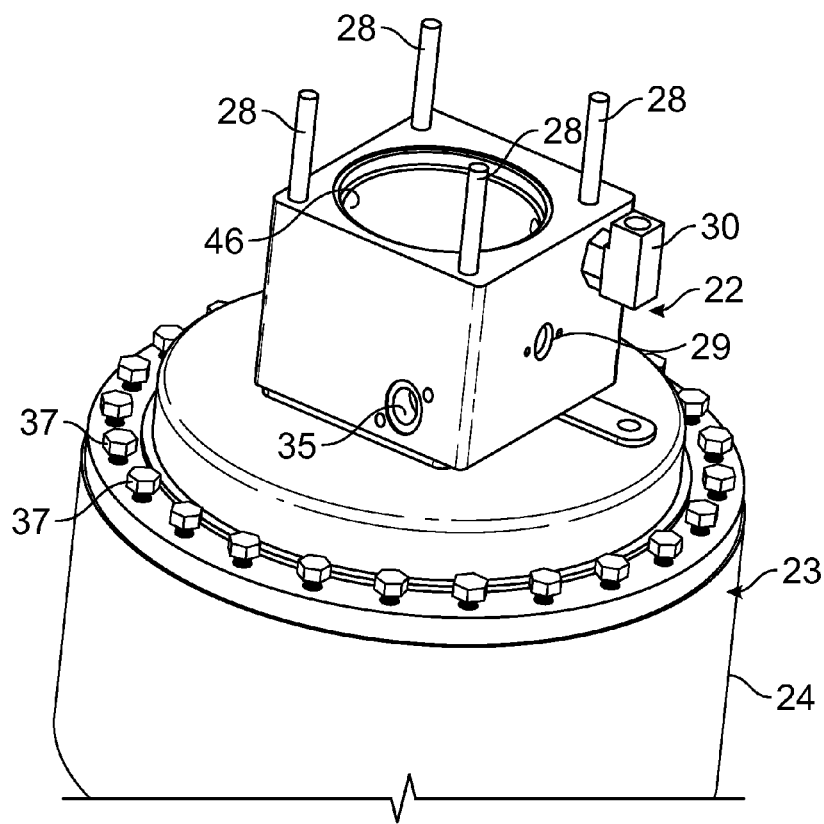
FIG. 3 is a top perspective view of the swing drive and swing sensor housing illustrated in FIG. 1 with the swing motor removed.
Figure 4:
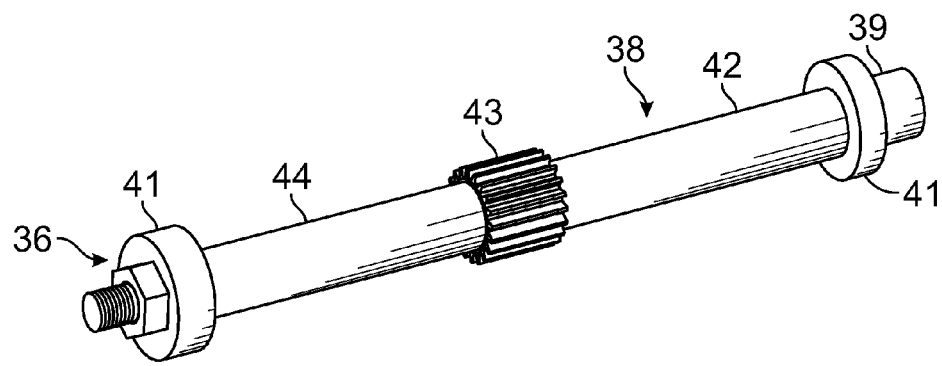
FIG. 4 is a perspective view of a disclosed target shaft, particularly illustrating the driven gear that is carried by the target shaft.

Turning to FIG. 3, the swing sensor housing 22 may include a breather assembly 34, a coupling opening 35, which is used to accommodate and support a coupling end 36 of the target shaft 38 shown in FIG. 4. An additional opening 29 is provided for supporting the speed sensor 33 (FIG. 1), which may be used with the target shaft 38 and rotary position sensor 40 or instead of the target shaft 38 and rotary position sensor 40. The studs 28 extend through the swing sensor housing 22 and may be used to secure the swing sensor housing 22 to the swing motor assembly 21 (FIG. 1) or, in other words, to sandwich the swing sensor housing 22 between the swing motor assembly 21 and the swing drive 23. A series of fasteners 37 may be used to secure the swing drive cover plate 25 to the swing casing 24.

Figure 5:
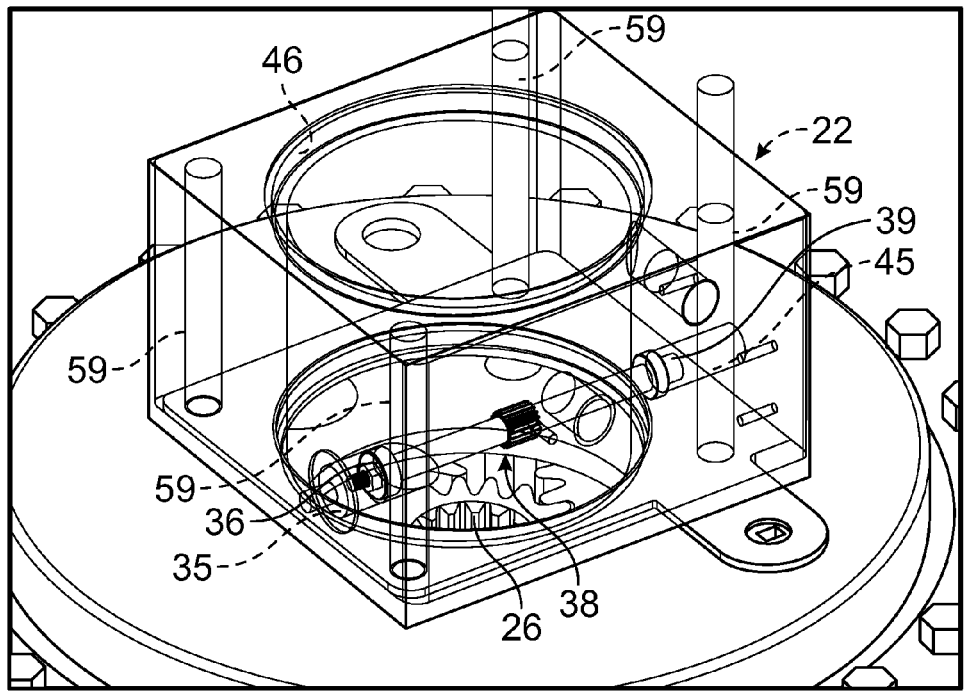
FIG. 5 is a perspective view of the swing drive, target shaft and swing sensor housing, shown in phantom.

The target shaft 38, the function of which will be described in greater detail in below, is illustrated in FIG. 4 and may be used with a rotary position sensor 40. Again, as an alternative or as a back-up, a speed sensor 33 may be employed. The target shaft 38 may include a coupling end 36 and a sensor end 39. Bushings 41 may be used to support the target shaft for rotational movement within the swing sensor housing 22 as discussed below. The target shaft 38 may include a shaft portion 42 that may pass through a driven gear 43. The shaft portion 42 may extend to the coupling end 36 or, as illustrated in FIG. 4, may pass through a separate sleeve 44. The position and support of the target shaft 38 within the swing sensor housing 22 is illustrated in FIG. 5. The swing sensor housing 22 is illustrated in phantom for this purpose. The coupling end 36 of the target shaft 38 may be supported within a coupling opening 35 and the sensor end 39 of the target shaft 38 may be supported within a sensor opening 45. The sensor housing 22 may include an upper opening 46 through which a splined drive shaft 47 (FIGS. 6-7) may pass as well as through opening 59 through which the studs 28 may pass.

Figure 6:
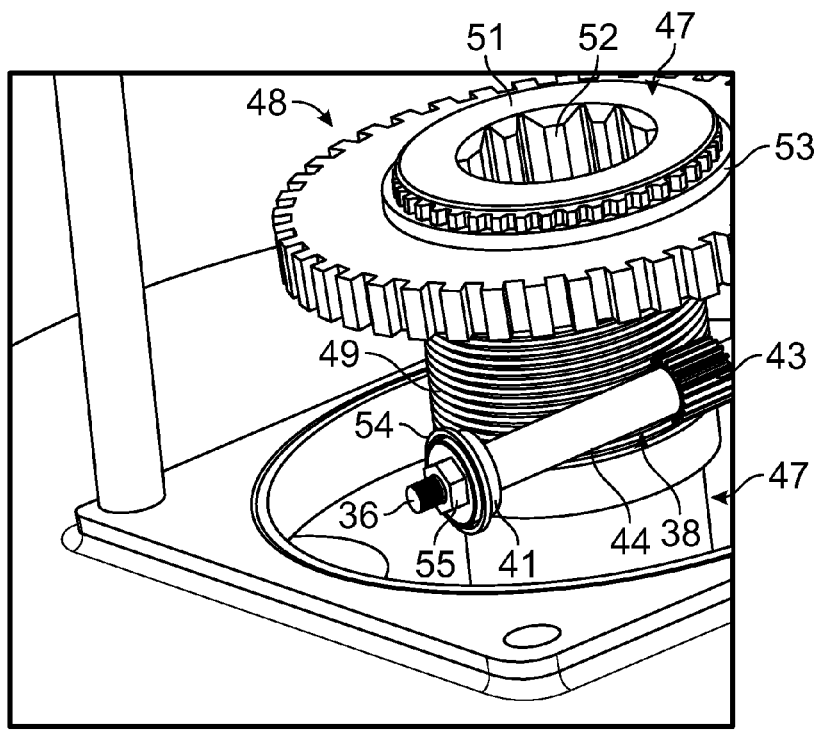
FIG. 6 is a partial perspective view of the splined drive shaft, target gear, target shaft and particularly illustrating the coupling of the driven gear disposed on the target shaft with the helical gear disposed on the splined drive shaft.
Figure 7:
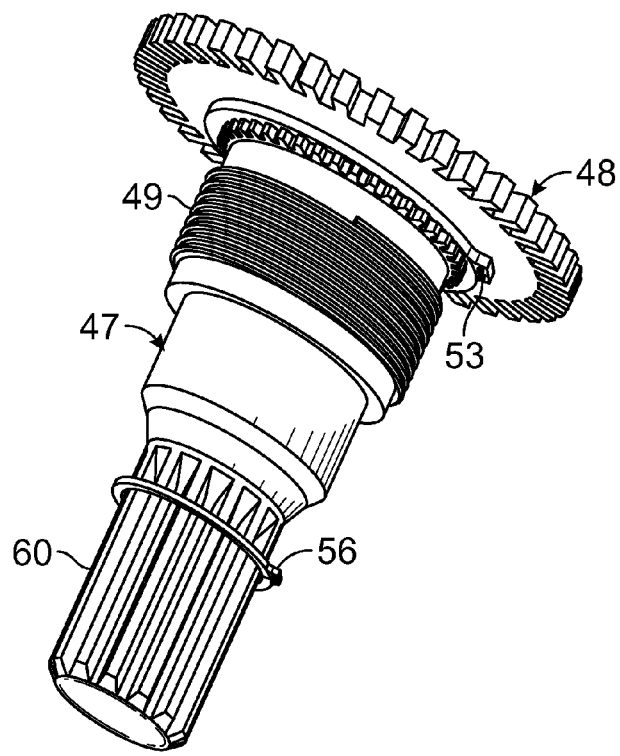
FIG. 7 is a perspective view of the splined drive shaft, helical gear and target gear.

Turning to FIGS. 6-7, the splined drive shaft 47, target gear 48, helical gear 49 and the coupling between the driven gear 43 and the target shaft 38 are illustrated. The splined drive shaft 47 may include a motor end 51 with a female splined opening 50 that may be coupled to the swing motor assembly 21. The splined drive shaft 47 may pass through the target gear 48 as well as the helical gear 49. As shown in FIG. 7, the splined drive shaft 47 may also include a swing drive end 60, which may be splined, and which may be received in the sun gear 26 (see FIGS. 2 and 5). The splined drive shaft 47 may pass through the helical gear 49 or the helical gear 49 may be an integral part of the splined drive shaft 47. The target gear 48 may be held in place on the splined drive shaft 47 by one or more snap rings shown at 53. A snap ring 54 can also be used to retain the coupling end 36 of the target shaft 38 in the coupling opening 35 (FIG. 3). An additional fastener such as a nut 55 may also be used to secure the bushings 41 in place against the sleeve 44. The snap ring 56 (FIG. 7) may be used to secure the swing drive end 60 of the splined drive shaft 47 in the sun gear 26 (FIG. 9).

Figure 8:
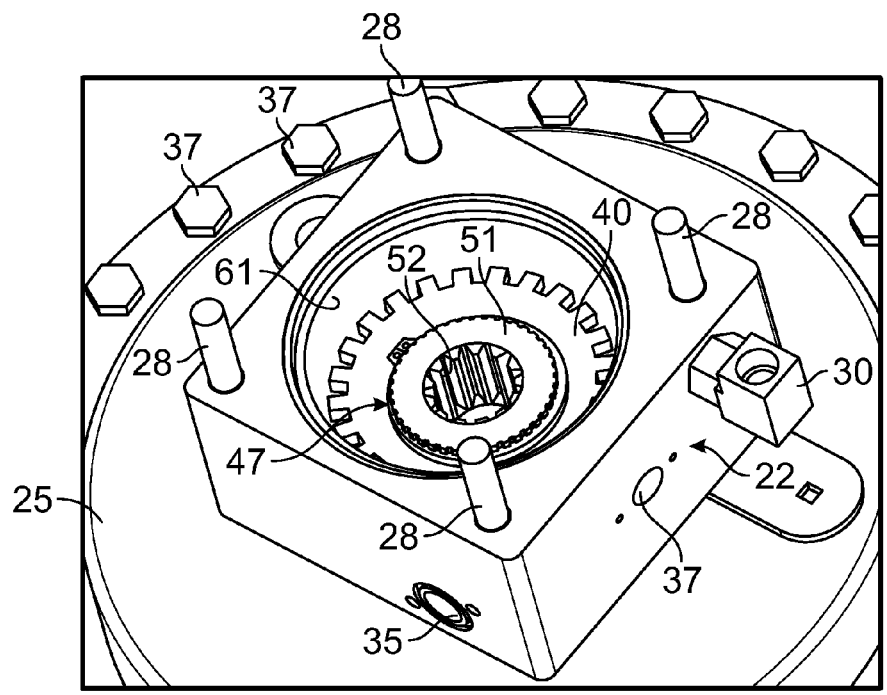
FIG. 8 is a top perspective view of the swing drive and swing sensor housing with the swing motor removed to reveal the target gear and top female end of the splined drive shaft.
Figure 9:
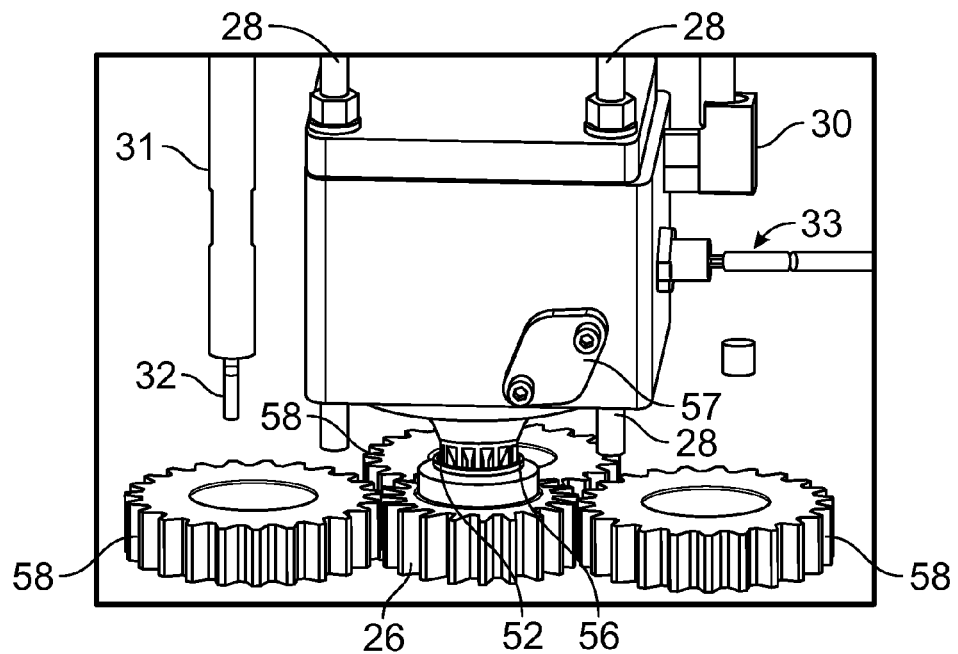
FIG. 9 is a front perspective view of the swing sensor housing and assembly and planetary gear system, particularly illustrating the lower male end of the splined drive shaft coupled to a sun gear.
Figure 10:
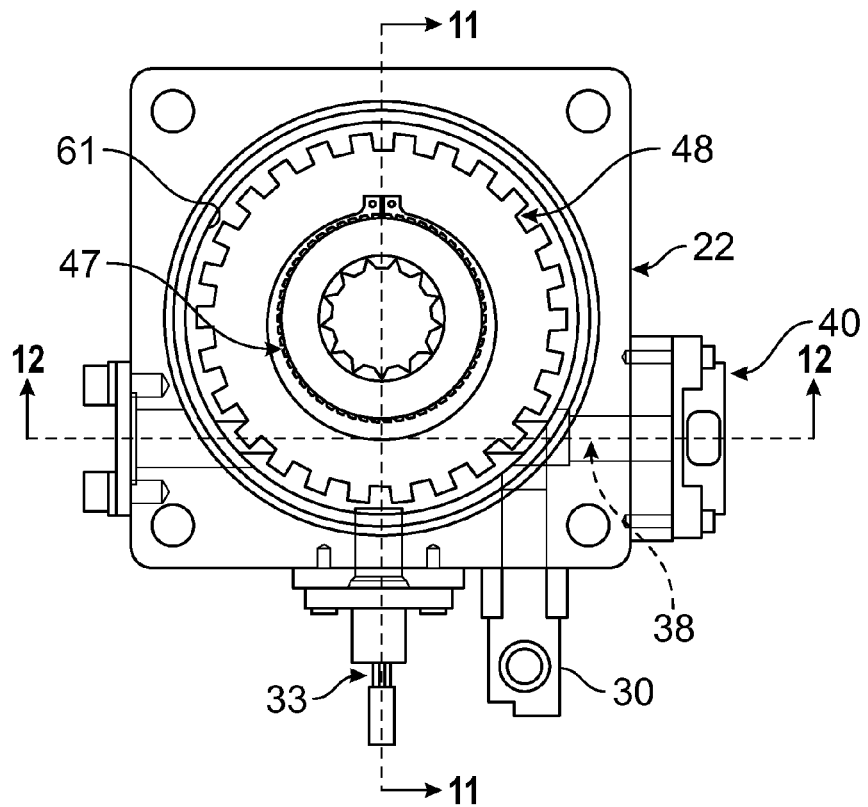
FIG. 10 is a top plan view of the swing sensor housing and associated assembly.

Turning to FIGS. 8-10, and first to FIG. 8, the target gear 48 and motor end 51 of the splined drive shaft 47 are accommodated within the swing sensor housing 22. As shown in FIG. 9, the coupling opening 35 may be enclosed by a cover 57 in suitable sealant or sealing members such as silicone or an o-ring. The distal end or swing drive end 60 of the splined drive shaft 47 may be received in the sun gear 26 and secured in place by the snap ring 56. The sun gear 26 may be enmeshed with a plurality of planetary gears 58 as illustrated in FIG. 9.

Figure 11:
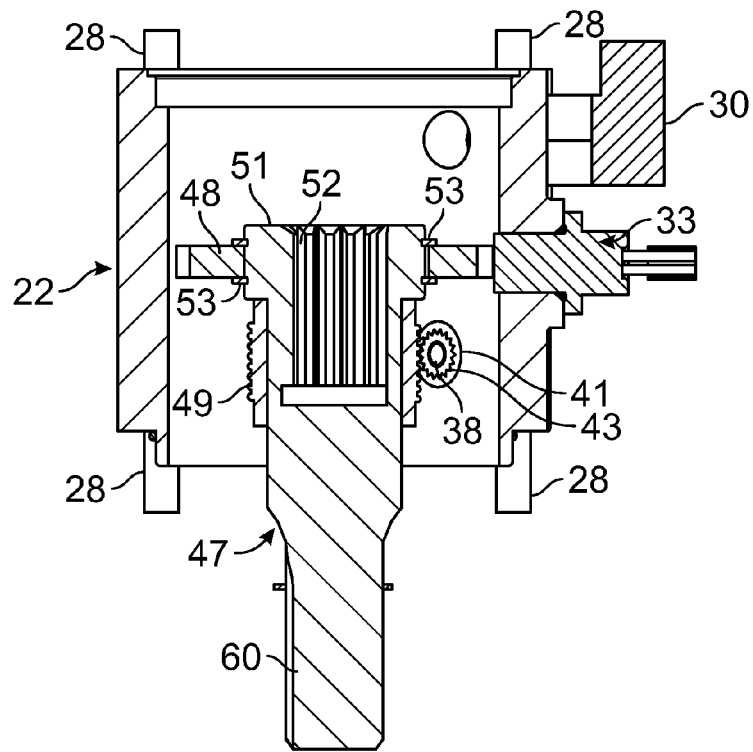
FIG. 11 is a sectional view taken substantially along line 11-11 of FIG. 10.

FIG. 10 is a top view of the swing sensor housing 22, particularly illustrating the opening 61 that receives the target gear 48 and splined drive shaft 47. FIG. 11 also illustrates the relative position of the target shaft 38, which is shown in phantom and the rotary position sensor 40.

Figure 12:
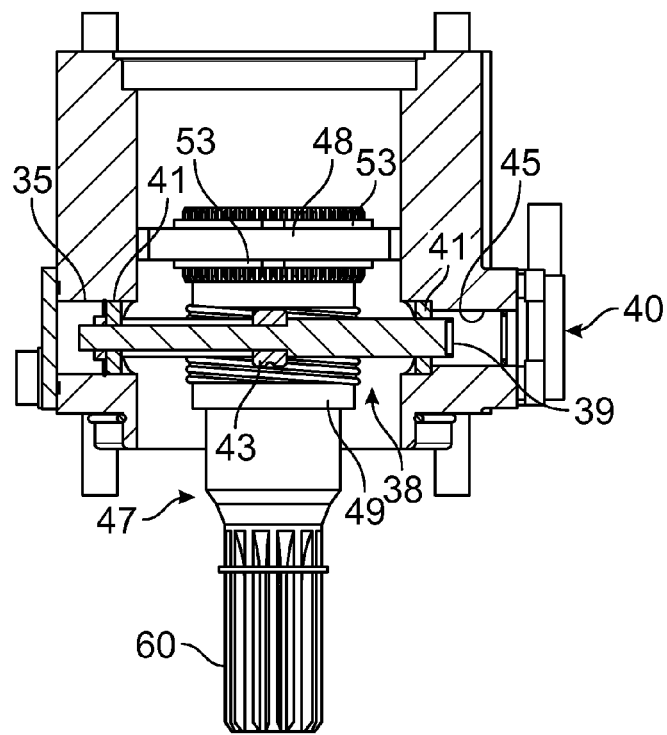
FIG. 12 is a sectional view taken substantially along line 12-12 of FIG. 10.

FIGS. 11-12 are sectional views of FIG. 10. In FIGS. 10 and 11, it can be seen that the target shaft 38 may pass in close proximity to the speed sensor 33. FIG. 11 also illustrates the coupling or enmeshment between the helical gear 49 and the driven gear 43 of the target shaft 38. FIG. 11 also illustrates the female splined opening 50 for coupling the splined drive shaft 47 to the swing motor assembly 21.

FIG. 12 illustrates the relative position between the target shaft 38 and the splined drive shaft 47. The target shaft 38 may be supported in the sensor opening 45 and the coupling opening 35 by the bushings 41. The driven gear 43 may be enmeshed with the helical gear 49 which rotates the target shaft 38 and the magnet or magnetized sensor end 39 of the target shaft 38. Rotation of the sensor end 39 in close proximity to rotary position sensor 40 provides a signal that reflects the number of rotations of the helical gear 49 and therefore the splined drive shaft 47. This, in turn, can be directly converted to a slue position angle.

Figure 13:
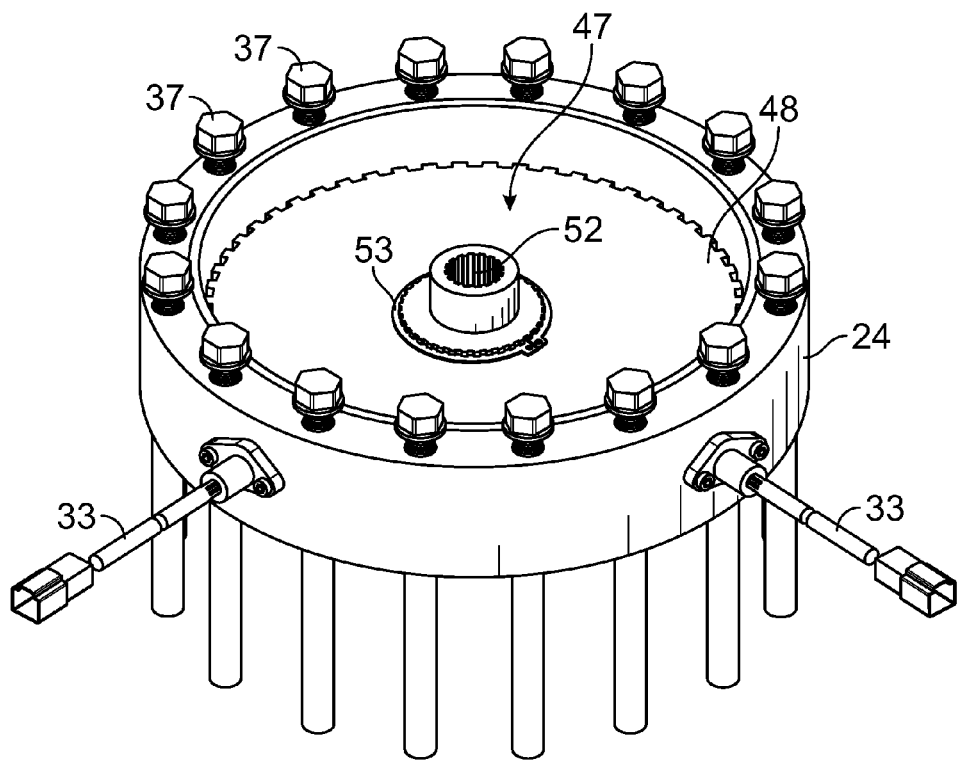
FIG. 13 is a perspective view of a swing drive, target gear and drive shaft in an embodiment that features the use of two speed sensors for redundantly detecting rotation of the target gear.

Thus, the slue positioning system 20 illustrated in FIGS. 1-12 may employ one speed sensor 33, two speed sensors 33, a rotary position sensor 40/target shaft 38 or a combination of a speed sensor 33 and rotary position sensor 40/target shaft 38. FIG. 1 illustrates the use of a speed sensor 33 in combination with a rotary position sensor 40. FIG. 13 illustrates the use of two speed sensors 33.

Figure 14:
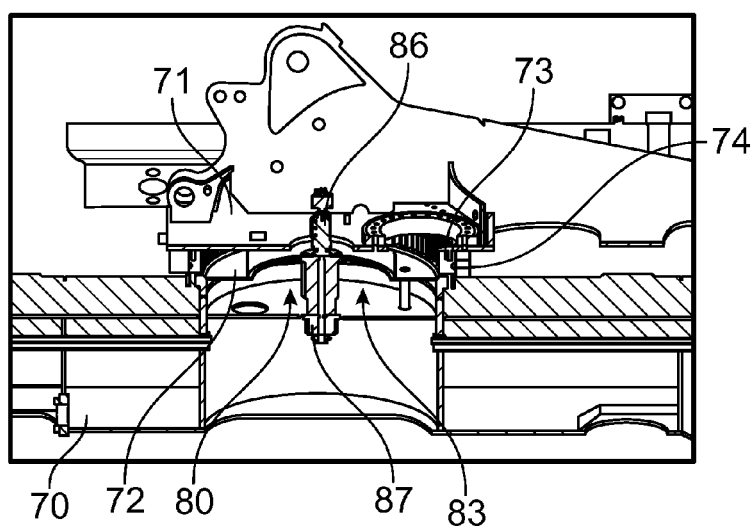
FIG. 14 is a sectional view of a lower frame, upper frame, rotary position sensor assembly, ring gear and swing gear.
Figure 15:
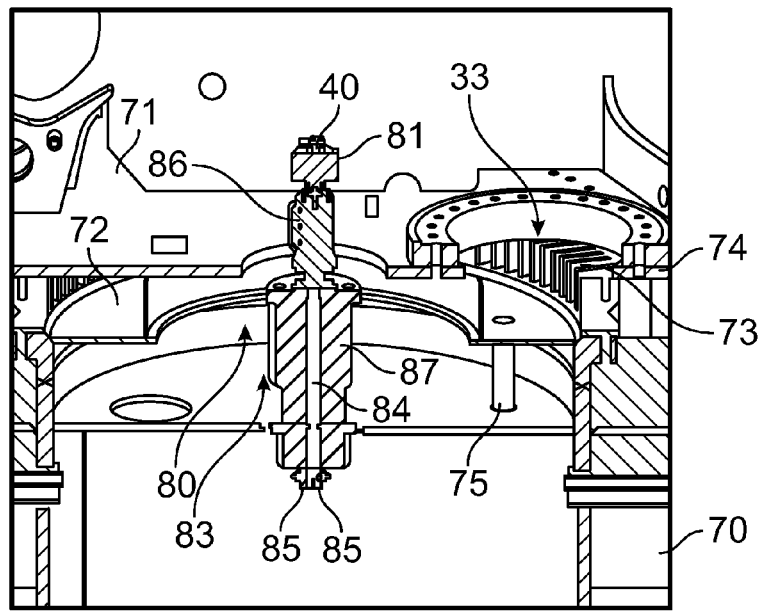
FIG. 15 is an enlarged sectional view of the lower frame, upper frame, rotary position sensor assembly, ring gear and swing gear illustrated in FIG. 14.

FIGS. 14-17 illustrate an embodiment applicable to equipment that does not include a target gear 48. As shown in FIGS. 14-15, and a lower frame 70 (or undercarriage) is rotatably coupled to an upper frame 71 by a ring gear 72 that is enmeshed with the swing gear 73. The swing gear 73 is accommodated within a bearing 74 that is connected to the upper frame 71. The lower frame 70 is connected to the ring gear 72 by one or more shafts or posts 75. Rotation of the upper frame 71 with respect to the lower frame 70 is detected and measured by the rotary position sensor assembly 80, which is illustrated in greater detail in FIGS. 15-17.

Figure 16:
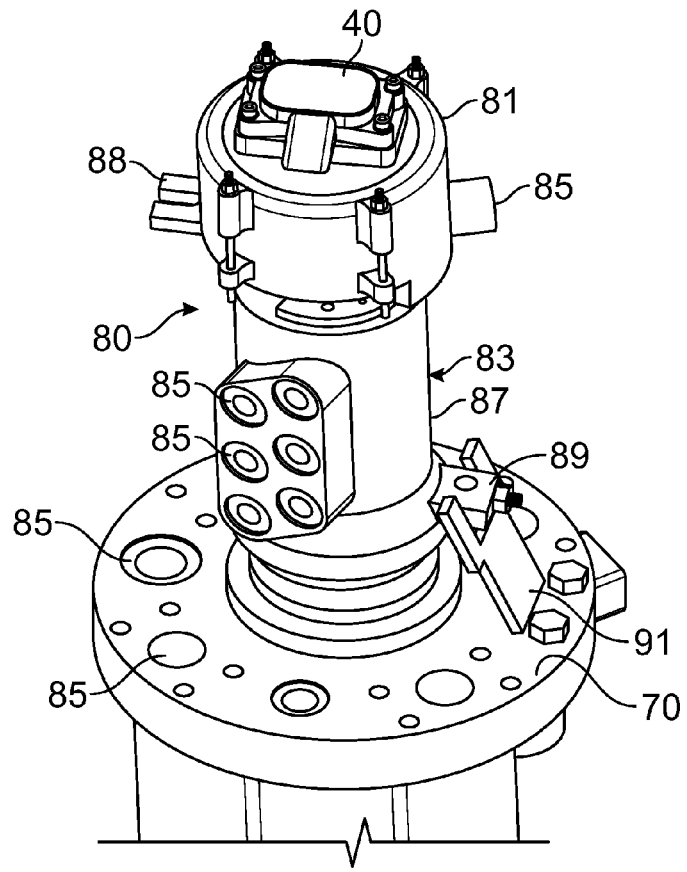
FIG. 16 is a perspective view of the rotary position sensor assembly illustrated in FIGS. 14 and 15.
Figure 17:
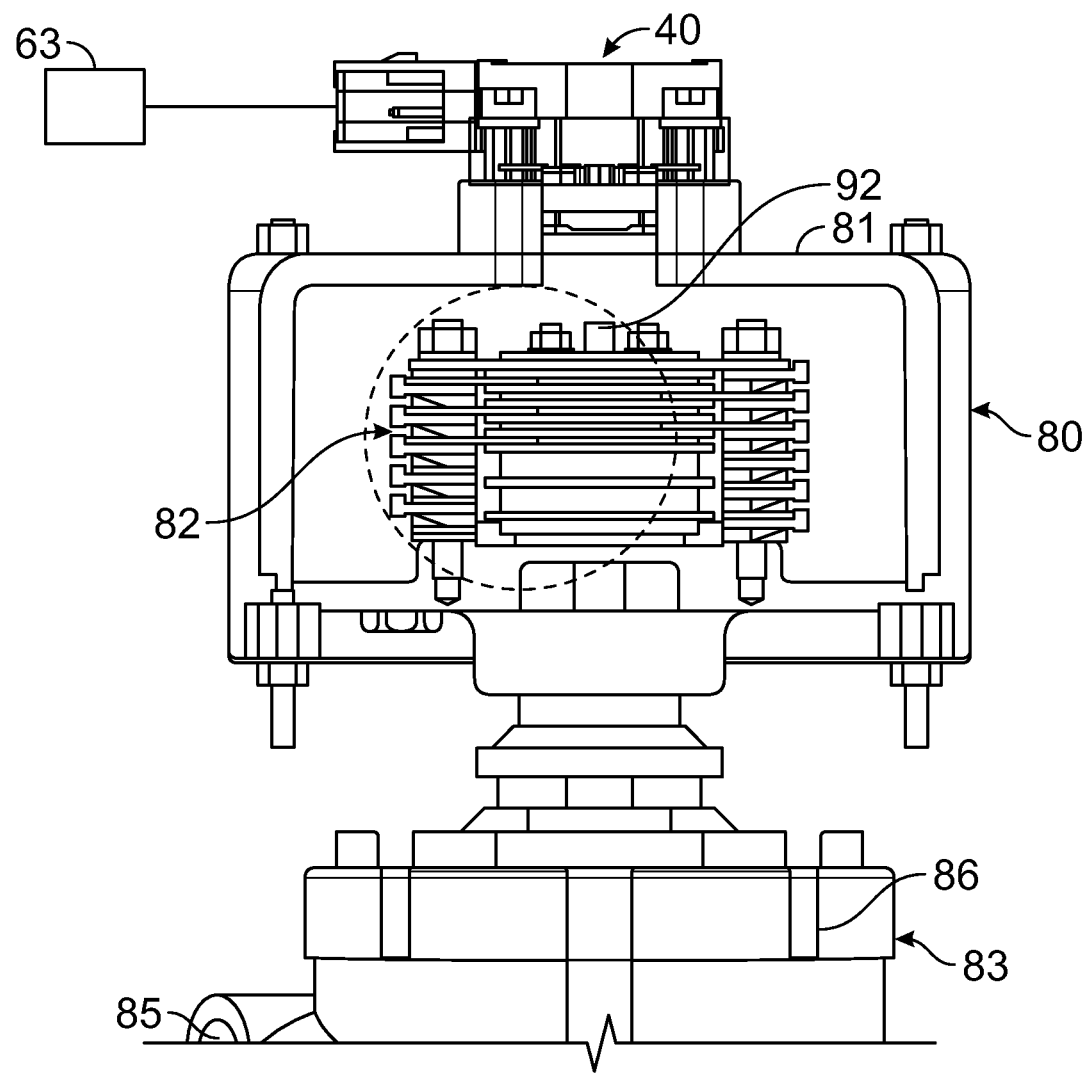
FIG. 17 is a partial sectional view of the rotary position sensor assembly illustrated in FIGS. 14-16.

Turning to FIGS. 15-16, rotary position sensor 40 is mounted to a cover 81 which encloses a slip ring assembly 82 (see FIG. 17). The cover 81 or the slip ring assembly 82 may be mounted to a swivel 83. The swivel 83 may be a hydraulic swivel with a central passageway 84 and various ports shown at 85 in FIGS. 15-16 for the purpose of communicating hydraulic fluid between the upper and lower frames 70, 71.

The swivel 83 includes an upper end 86 that is coupled to the upper frame 71 and a lower end 87 that is coupled to the lower frame 70 as best seen in FIG. 15. Turning to FIG. 16, the upper end 86 of the swivel 83 includes a tab or fork 88 which is coupled to the upper frame 71 to maintain an alignment between the sensor 40, cover 81 and the upper frame 71. Similarly, the lower end 87 of the swivel 83 also includes a tab 89 which is received in the fork 91 that is connected to the lower frame 70 to maintain an alignment between the magnet 92, slip ring assembly 82 and lower frame 70 (as well as lower end 87 of the swivel 83).

As shown in FIG. 17, the rotary position sensor 40 is mounted on top of the cover 81 which encloses the slip ring assembly 82. The slip ring assembly 82 is coupled to the upper end 86 of the swivel 83. In operation, as the upper frame 71 rotates with respect to the lower frame 70, the sensed element or magnet 92 rotates with respect to the rotary position sensor 40, which has a fixed positional relationship with the upper frame 71. The rotary position sensor 40 may be coupled to an electronic control module (ECM) 63 as shown.

If the rotary position sensor assembly 80 of FIGS. 14-17 is not employed, a speed sensor 33 may be positioned above the swing gear 73 as illustrated in FIG. 15. Regardless, the speed sensor 33 could be employed for the sake of redundancy.

INDUSTRIAL APPLICABILITY

Thus, a system for sensing or detecting the slue position of a machine, such as an excavator, crane, foundation drill, material handler, etc. is shown and described. One disclosed system may include a swing sensor housing sandwiched between a swing motor or swing motor assembly and a swing drive. The swing motor may be coupled to the swing drive assembly through the swing sensor housing. A rotary position sensor or a speed sensor may be used to measure the rotation of the target gear. As described above, the rotary position sensor or the speed sensor may be a MEMS based device.

Another disclosed slue position sensing system may be employed for upper and lower frames that rotate with respect to each other, such as an upper frame and an undercarriage of a wheel excavator that are rotatably coupled together by a ring gear and a swing gear. The upper frame is coupled to at least one of a rotary position sensor or speed sensor. When a rotary position sensor is employed, the rotary position sensor is part of an assembly that includes a slip ring assembly and a magnetized element disposed between the slip ring assembly and the rotary position sensor. The slip ring assembly is mounted to a swivel, one end of which is coupled to the upper frame and the other end of which is coupled to the lower frame. When a speed sensor is employed, the speed sensor is mounted to the upper frame in close proximity to the swing gear so the speed sensor can detect rotation of the swing gear.

Methods for retrofitting a swing motor and a swing drive assembly with a slue position sensing system are also disclosed. One disclosed method may include disassembling the swing motor from the swing drive and mounting a swing sensor housing between the swing motor and swing drive. A target gear may be installed in the swing sensor housing and may be coupled to a splined drive shaft that may be coupled to the swing motor through the swing sensor housing to the swing drive. A speed sensor or a rotary position sensor may be used to measure the rotation of the target gear for determining slue position.

Another method for retrofitting a swing drive assembly with a slue position sensing system includes providing an upper frame and a lower frame. The lower frame is coupled to a ring gear and the upper frame is coupled to a swing gear. The swing gear and ring gear are enmeshed so the upper frame may rotate about the ring gear. The method includes coupling at least one of a rotary position sensor or a speed sensor to the upper frame.

The invention claimed is:

1. A slue position sensing system comprising:
a swing sensor housing accommodating a target gear, the target gear is coupled to a drive shaft that passes through a helical gear,
the swing sensor housing supporting at least one of a rotary position sensor or a speed sensor in close proximity to a target shaft that extends across the swing sensor housing, the target shaft passing through a driven gear that is enmeshed with the helical gear.

2. The system of claim 1 wherein the at least one of the rotary position sensor and the speed sensor is linked to a controller.

3. The system of claim 1 wherein the swing sensor housing is disposed between a swing motor and a swing drive.

4. The system of claim 1 wherein the swing sensor housing includes two openings including a coupling opening and a sensor opening, a coupling end of the target shaft being received in the coupling opening, a sensor end of the target shaft being received in the sensor opening, the rotary position sensor being coupled to the sensor opening.

5. The system of claim 4 wherein the coupling opening accommodates a first bearing through which the coupling end of the target shaft passes and the sensor opening accommodates a second bearing through which the sensor end of the target shaft passes.

6. The system of claim 1 wherein the swing sensor housing supports both a speed sensor and a rotary position sensor.

7. A method for retrofitting a swing drive assembly with a slue position sensing system, the method comprising:
providing a swing sensor housing;
installing a target gear in the swing sensor housing, the target gear being coupled to a drive shaft having a first end for coupling the target gear to a swing motor and a second end for coupling the target gear to a swing drive, the drive shaft passing through a helical gear;
installing a target shaft in the swing sensor housing, the target shaft passing through and being coupled to a driven gear, the driven and helical gears being enmeshed; and
installing a speed sensor or a rotary position sensor in close proximity to the target shaft.

8. The method of claim 7 wherein
the target shaft including a sensor end that is magnetized and the swing sensor housing includes a sensor opening, and the method further comprises
placing the speed sensor or rotary position sensor in the sensor opening in proximity to the sensor end of the target shaft.

9. The method of claim 7 further including:
coupling the speed sensor or rotary position sensor to a controller.

* * * * *